US006535804B1

(12) United States Patent
Chun

(10) Patent No.: US 6,535,804 B1
(45) Date of Patent: Mar. 18, 2003

(54) VEHICLE RECORDER SYSTEM

(75) Inventor: Yu Chin Chun, Taipei (TW)

(73) Assignee: Hu Hsueh Mei, Taipei Hsien (TW)

( * ) Notice: Subject to any disclaimer, the term of this patent is extended or adjusted under 35 U.S.C. 154(b) by 0 days.

(21) Appl. No.: 10/174,827

(22) Filed: Jun. 20, 2002

(51) Int. Cl.[7] .................................................. G06F 7/00

(52) U.S. Cl. ............................................ 701/35; 701/29

(58) Field of Search ............................ 701/35, 29, 28, 701/33, 34, 66, 63, 48; 340/933, 937, 438, 439

(56) References Cited

U.S. PATENT DOCUMENTS 5,581,464 A * 12/1996 Woll et al. .................... 701/35
5,836,529 A * 11/1998 Gibbs .......................... 701/35
6,154,694 A * 11/2000 Aoki ........................... 701/35
6,246,933 B1 * 6/2001 Bague ......................... 701/35
6,285,931 B1 * 7/2001 Hottori et al. ................ 701/29
6,415,210 B2 * 2/2002 Hozuka ....................... 701/35

* cited by examiner

*Primary Examiner*—Richard M. Camby

(57) ABSTRACT

A vehicle recorder system comprises a system control unit as a control center of the system; a non-volatile memory card which is a reading-only and repeatedly writing memory; a control keyboard unit having functions of inputting, and selections; a power supply for supplying power to the system; a sensing detecting unit for capturing data of a moving vehicle; and an A/V compressing unit for compressing image and voice data for reducing the data required to be stored in the non-volatile memory card. The non-volatile memory card is used as a primary recorder and a micro-computer is used as a control center. An infrared lenses is used in real-time image capturing with a Doppler detector, and A/V compressor. Not only the operation of the vehicle can be recorded completely, but the environment condition can be recorded, and thereby, the faults due to manual determination can be avoided.

10 Claims, 9 Drawing Sheets

VEHICLE RECORDER SYSTEM

FIELD OF THE INVENTION

The present invention relates to vehicle recorders, and particularly to a vehicle recorder system using a non-volatie memory card to reconstruct the event conditions after a traffic accident occurs. Thereby, the vehicle conditions and environment states can be correctly determined.

BACKGROUND OF THE INVENTION

With the increment of traffic flows, traffic accidents occur frequently, and thus many disputes are induced. Most of the disputes are due to the reasons that the responsibilities can not be well identified since the facts about the accidents can not be reconstructed. Thereby, a longer period of time is required to solve the disputations. The conventional ways for determining accident events include to determine the direction and the location of the vehicle, conditions of the instruments, traces of braking, etc. However, these ways are only auxiliary ways for judging the conditions of accidents. They can not accurately determine the real conditions as the accident occurs. As a result, many faulty determinations are induced.

Moreover, the accident site or the vehicle may possibly Undergo changes because of rains, movement of the vehicle, fires, etc. Thus, the responsibility of the accident can not be determined.

SUMMARY OF THE INVENTION

Accordingly, the primary object of the present invention is to provide a vehicle recorder system, wherein the recorder has a non-volatile memory card which can record the traffic condition, so that as an accident occurs, the data in the non-volatile memory card can be read by another mainframe. Thereby, the user can reconstruct the traffic conditions so as to make a correct judgement about the responsibility of the accident Another object of the present invention is to provide a vehicle recorder system, wherein a palm-top card reader can be connected to the recorder for reading the data in a non-volatile memory card. Thereby, a traffic police can determine whether a driver has violated the traffic rule.

A further object of the present invention is to provide a vehicle recorder system, wherein the data about the vehicle can be recorded completely so that the data can be used as a reference for improving traffic conditions.

The final object of the present invention is to provide a vehicle recorder system, wherein in maintenance, the operator can read the data stored in the non-volatile memory card of the recorder so as to understand the condition of the vehicle. Thereby, the operator may repair the vehicle immediately and correctly, so as to reduce the repairing time.

To achieve the above objects, the present invention provides a vehicle recorder system which comprises a system control unit as a control center of the system so that the system is capable of recording successfully; a non-volatile memory card for reading-only and writing repeatedly; if the capacity of the non-volatile memory card is saturated, the non-volatile memory card is capable of being used repeatedly; a control keyboard unit having functions of inputting, and selections; a, power supply for supplying power to the system; a sensing detecting unit for capturing data of a moving vehicle; and an A/V compressing unit for compressing image and voice data for reducing the data required to be stored in the non-volatile memory card. The non-volatile memory card is used as a primary recorder and a microcomputer is used as a control center. An infrared lens is used in real-time image capturing with a Doppler detector, and A/V compressor. Not only the operation of the vehicle can be recorded completely, but the environment condition can be recorded, and thereby, the faults due to manual determination can be avoided.

The various objects and advantages of the present invention will be more readily understood from the following detailed description when read in conjunction with the appended drawing.

DESCRIPTION OF THE PREFERRED EMBODIMENT

Figure 1:
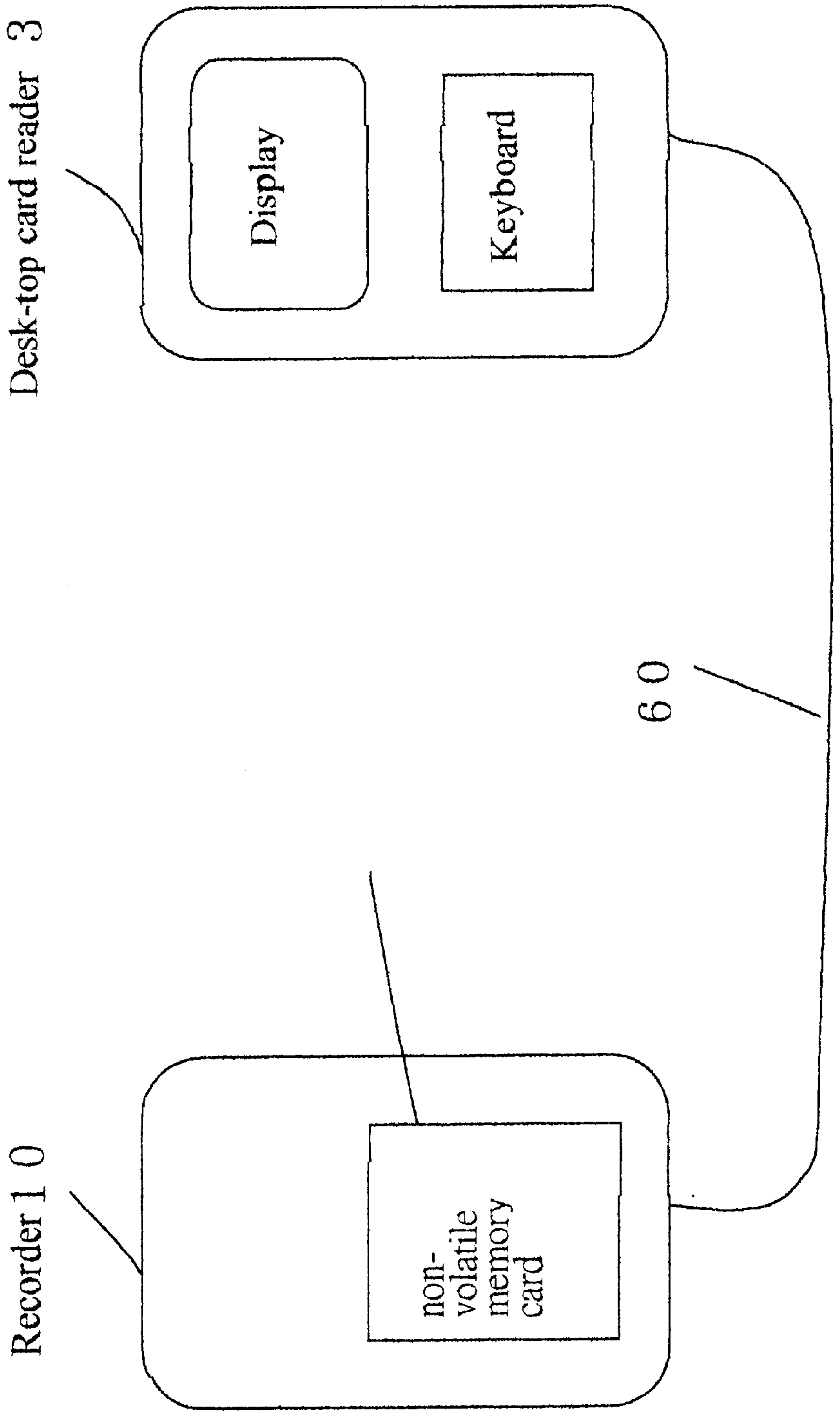
FIG. 1 shows one construction of the preferred embodiment of the present invention.
Figure 2:
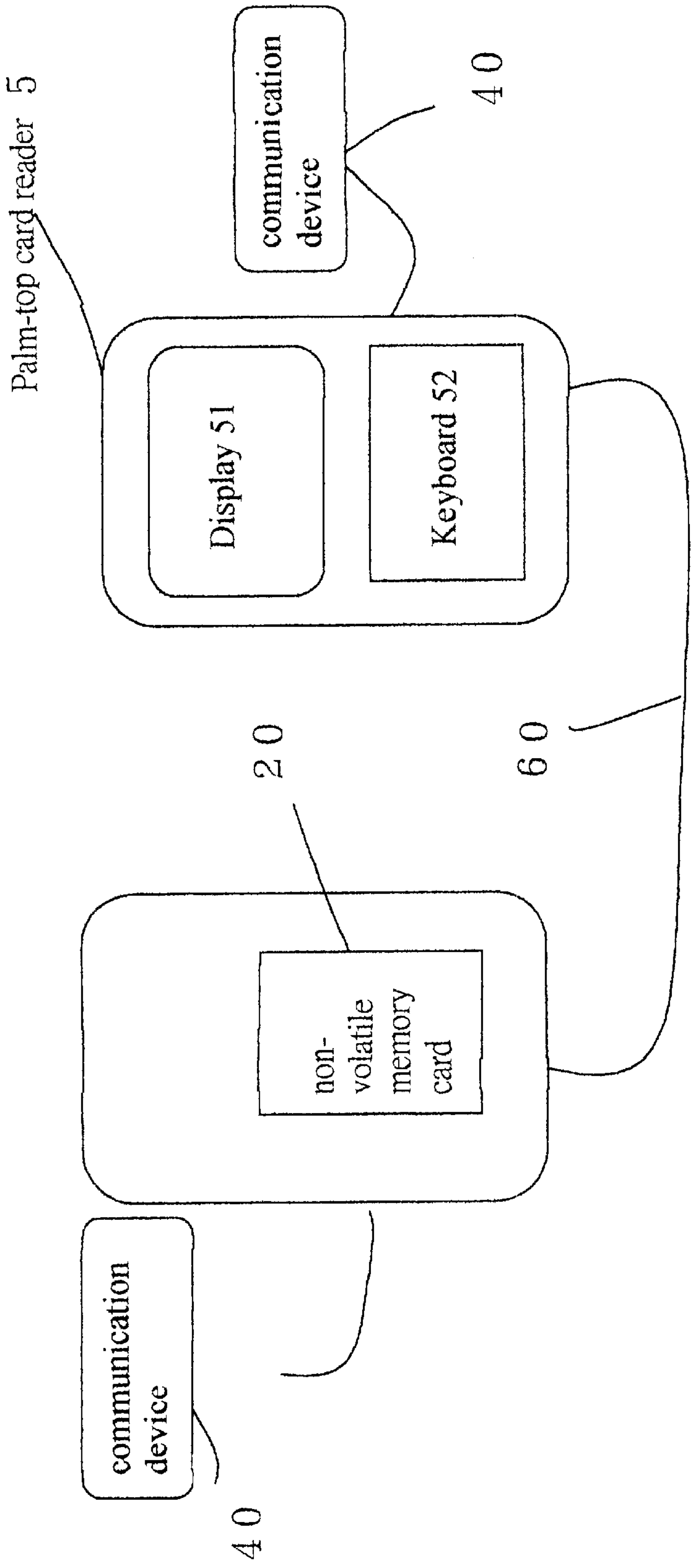
FIG. 2 shows another construction of the preferred embodiment of the present invention.

The vehicle recorder system of the present invention has a structure illustrated in FIG. 1. The vehicle recorder system approximately includes a recorder 10, a non-volatile memory card 20, a desk-top card reader 30, and a transmission line 60 The same structure can be used in a palm-top card reader 50 with other necessary communication device 40 and transmission line 60, as shown in FIG. 2.

The recorder 10 records repeatedly the travelling condition of the vehicle, such as the incoming image, voices within the car body, speed, braking time and power, throttle conditions, power, and environmental conditions.

A non-volatile memory card 20 serves for recording the data completely and has the effect of reading-only and writing repeatedly.

The palm-top card reader 50 includes a display 51 and a keyboard 52. The palm-top card reader 50 can be connected to a non-volatile memory card 20 and is capable of displaying the recording data about the vehicle conditions and environmental conditions in the display Si. Thereby, the operator can read it immediately.

Figure 3:
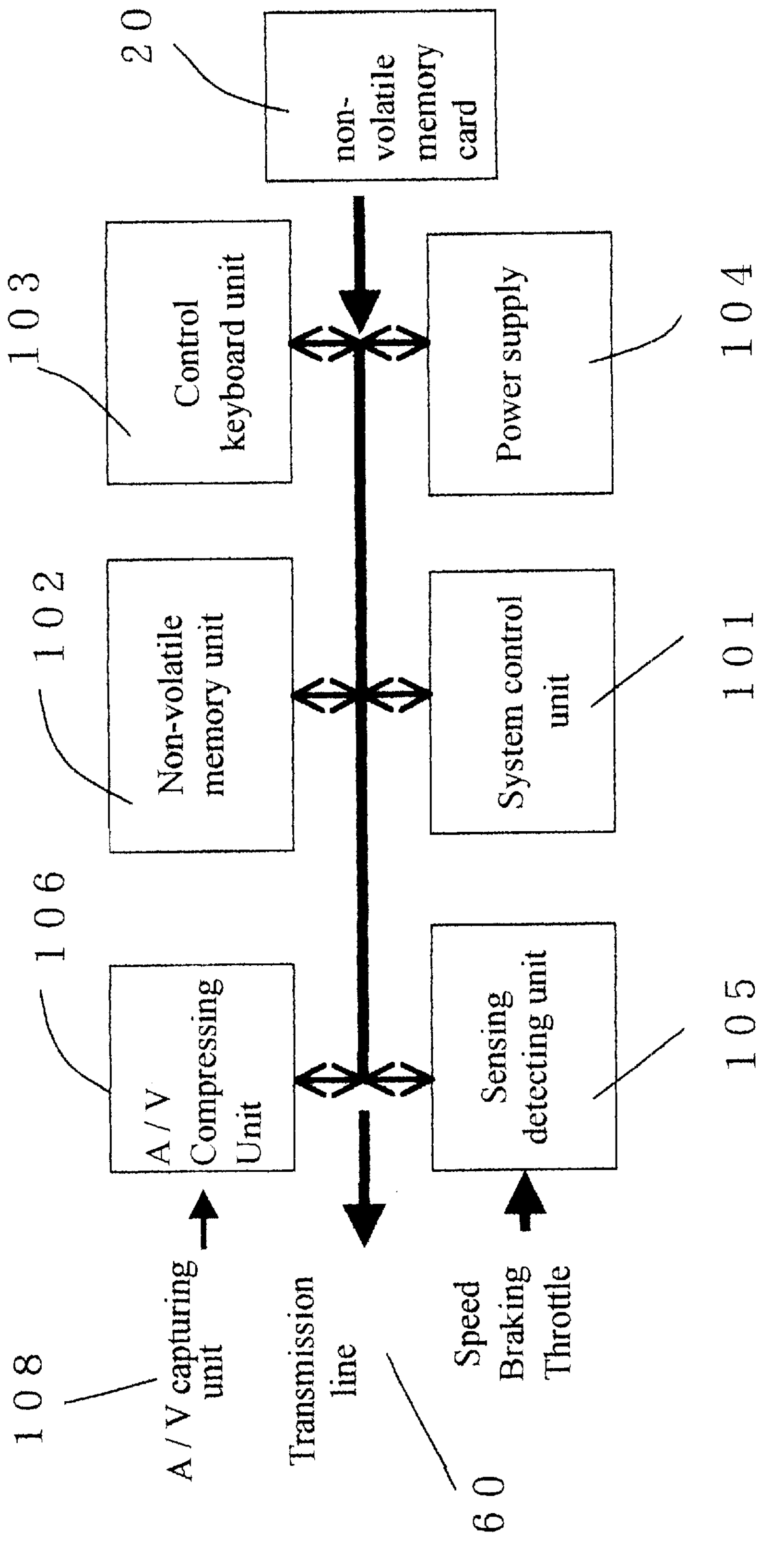
FIG. 3 is a block diagram of the recorder of the present invention.

The communication device 40 is used to be connected to the palm-top card reader 50. Thereby, the data read by the non-volatile memory card 20, such as an accident or vehicle conditions, can be reported by a communication system, such as Data Call or Short Message Service. Moreover, data can be automatically stored in order, Referring to FIG. 3, the recorder 10 of the present invention further includes a system control unit 101, a non-volatile memory unit 102, a control keyboard unit 103, a power supply 104, a sensing detecting unit 105, an A/V compressing unit 106, etc. A non-volatile memory card 20 and an A/V capturing unit 108 can be used within the recorder 10.

The system control unit 101 is a kernel of the recorder 10. In this embodiment, the system control unit 101 is a microprocessor for controlling all units in the recorder 10.

The non-volatile memory unit 102 can store the data therein in power-off condition. The non-volatile memory unit 102 may be connected to a recorder 10. The non-volatile memory unit 102 may be an EEPROM which is a read-only and write-repeated device. When the memory capacity is exhausted, data can be recorded repeatedly.

The control keyboard unit 103 has the functions of inputting data, selection and other applications. Thereby, the operator can rapidly conveniently operate and use the recorder 10.

The power supply 104 serves to supply power to the recorder 10. In use, it can be connected to a vehicle battery, or to a DC charger so that as the power of the battery is exhausted, it can be operated normally by charging power from the DC charger.

The sensing detecting unit 105 can capture various real-time messages in travelling, such as speed of the car, braking condition of the car, throttle opening, etc. Then, the messages are recorded completely in the non-volatile memory card 20 by the system control unit 101

The A/V compressing unit 106 has an A/V capturing unit 108 installed out of the recorder 10 which serves for capturing the vehicle conditions and real-time audio and video conditions, In this embodiment, charge coupling device (CCD) with infrared lenses is used to capture images and then the images are compressed by the A/V compressing unit 106 for reducing the storage volume of the non-volatile memory card 20. Various compressing technologies can be used in the recorder 10 of the present invention (such as MP3 compressing technology).

Figure 4:
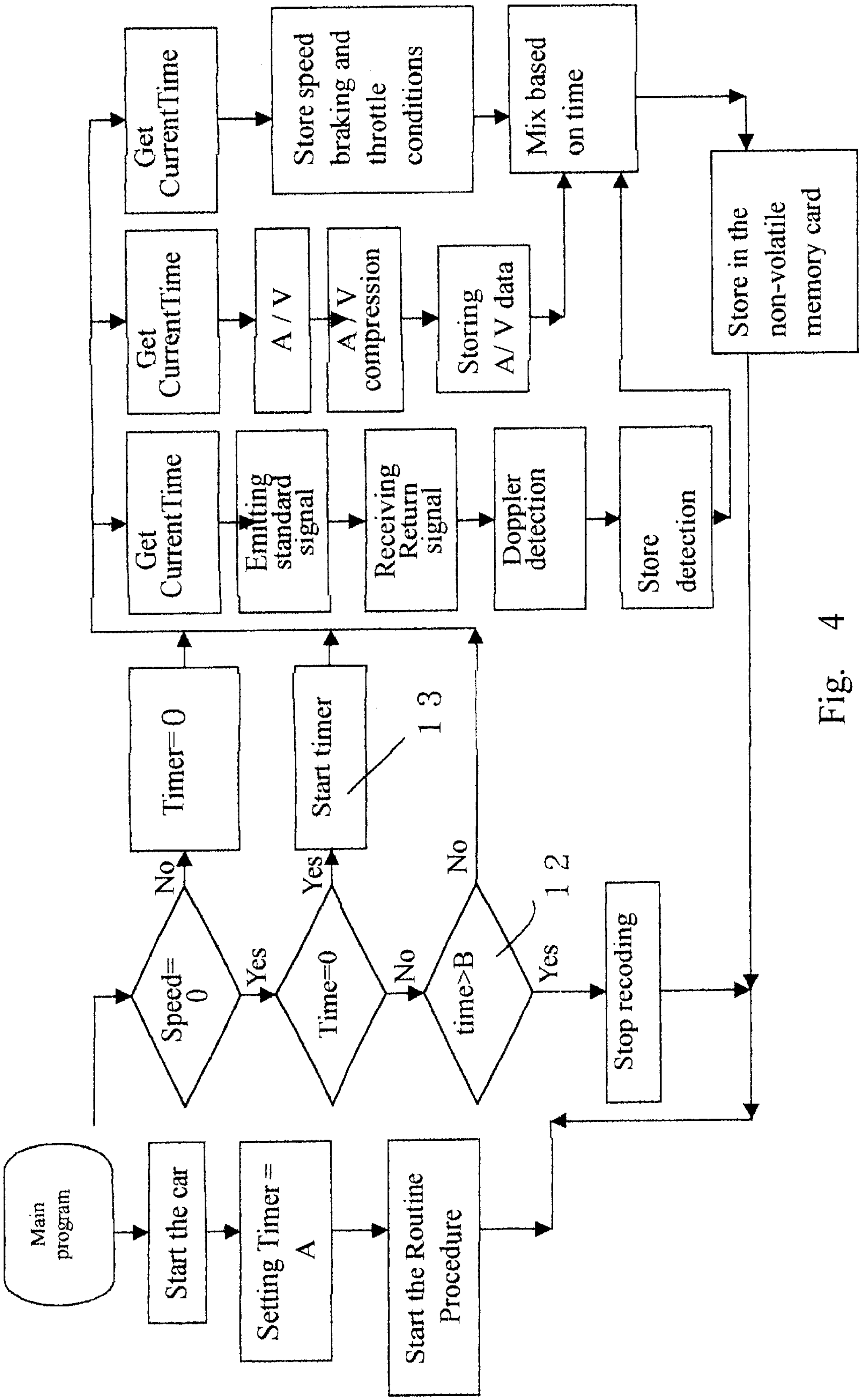
FIG. 4 is a control flow of the system control unit of the present invention.
Figure 7:
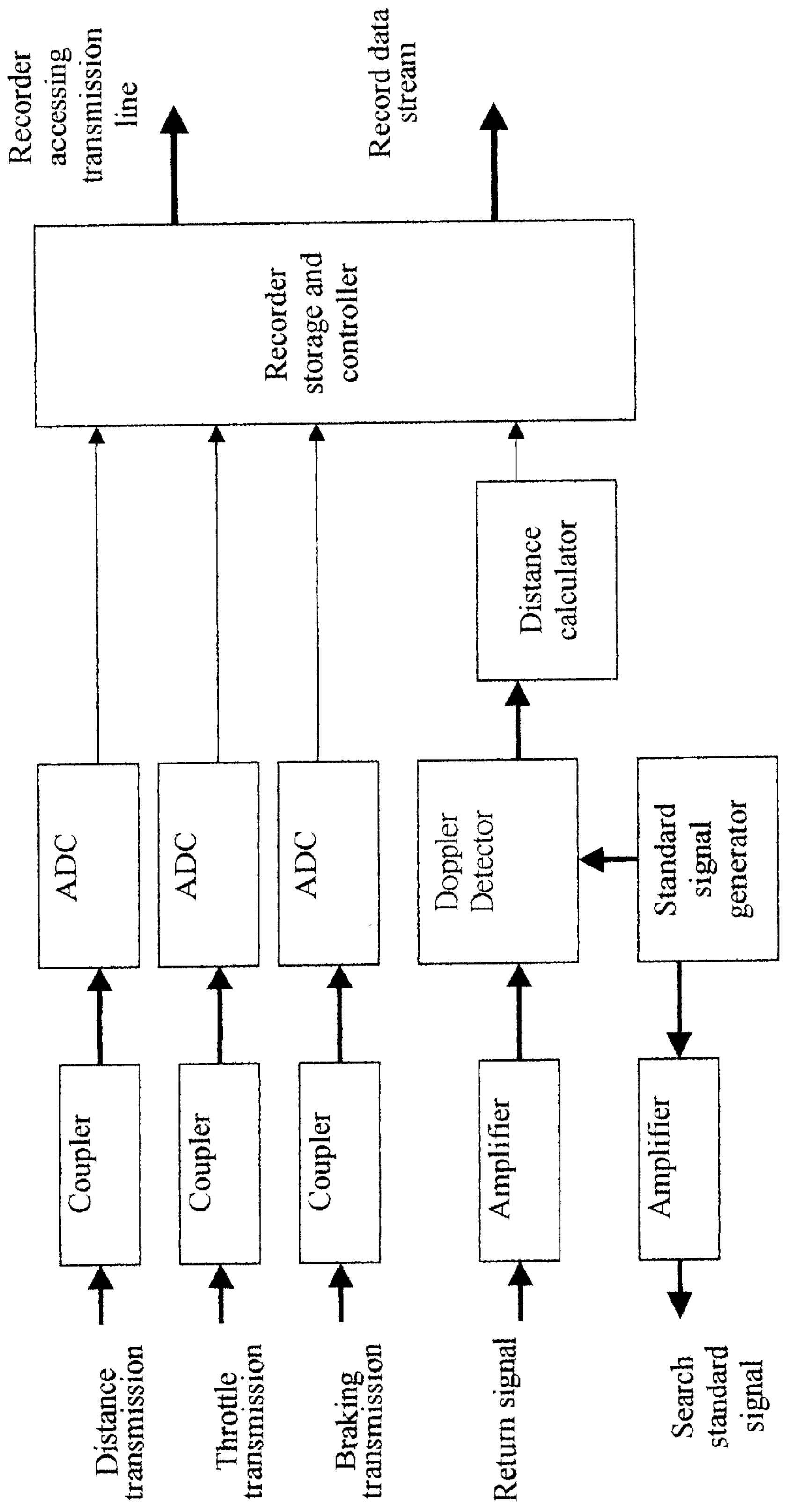
FIG. 7 is a block diagram of the sensing detecting unit of the present invention.

Referring to FIG. 4, the control process of the recorder 10 in the sensing detecting unit of the present invention is illustrated. In the whole control process, such as the system control unit 101, a timer A is set with a time period 11 which is longer than a predetermined time period 12 in timer B, which is larger than zero. After the car is actuated, the system with actuate the timer A. Since the vehicle does not move, the speed is 0 (the car is motionless). Since the timer A is actuated, the timer is not at 0. If the counting of timer A is larger than the counting of timer B, then the system considers that the vehicle is stopped. Then all the recording process is stopped. On the contrary, if the speed of the vehicle is not equal to 0, then the system will close the timer A and actuates the sensing process of the sensing detecting unit 105 (referring to FIG. 7). Signals are emitted from a standard signal generator and then amplified by an amplifier before being sent out. When the signals are sent back, they are amplified again and received by a Doppler detector for detecting the return path so as to know the distance to a front object. The distance is recorded. Meanwhile, the A/V capturing unit 108 will capture the image by infrared.

Figure 5:
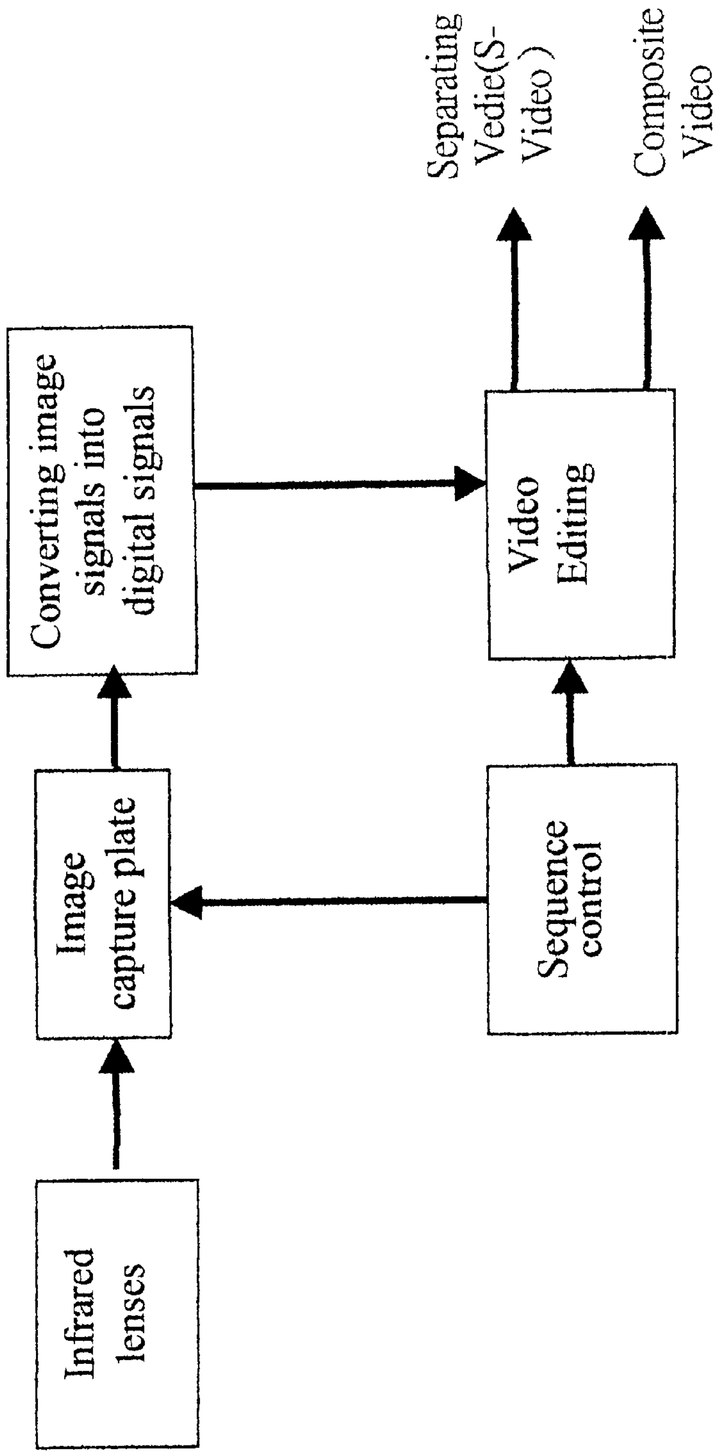
FIG. 5 is a block diagram about the image capturing of the present invention.
Figure 6:
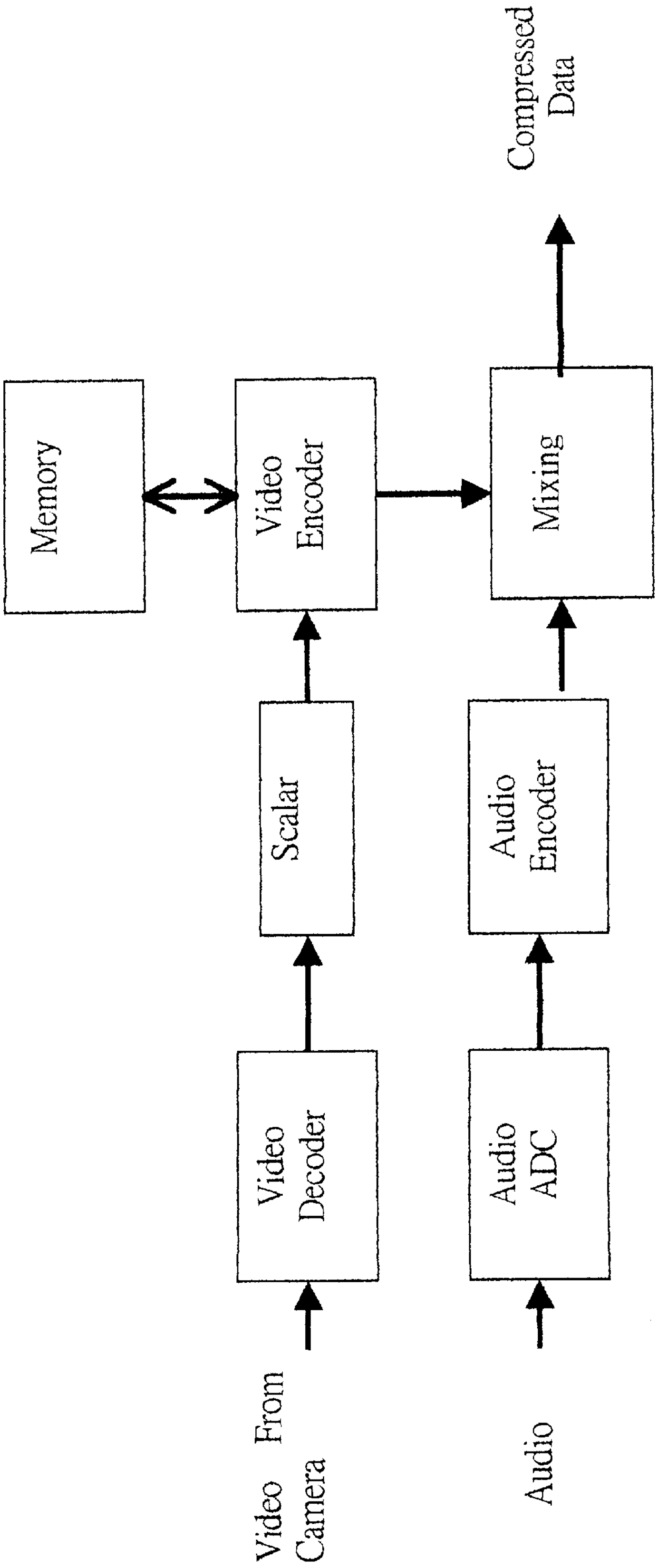
FIG. 6 is a block diagram about the A/V compressing unit of the present invention.

A control time sequence is used to capture the environmental image and voice of the vehicle (referring to FIG. 5) for sensing color and light. The captured image is formed as a sample data by a signal converter. Next, the image data is processed for further editing a single image or mixing images. When the process of capturing image is completed, the process of A/V compressing is processed Preferring to FIG. 6), and then the image signal and voice signal from the infrared lenses are processed separately. The image signals are decoded by an image decoder and are encoded by the encoder and then are stored in a memory. The voice signal is processed by a voice converter and encoded by an encoder. Then the processed voice signals are mixed with the image signals which are compressed. Then the data about speed of the car, throttle opening, braking conditions sensed by the sensing detecting unit 105 (referring to FIG. 7) are transferred by a coupler and are covered by an analog to digital converter. The executing times for the sensing detecting unit 105, A/V capturing unit 108 and Doppler detector are recorded. The mixing of the voice and image signals are based on the recording time. Then the mixed signals are stored in the non-volatile memory unit 102. The process is repeated. If the vehicle is stopped, the speed is equal to 0. Since the timer is closed and thus the counter of the timer is 0. If a vehicle is driven and then is stopped, then speed is 0 and since the timer has been closed and thus the counting is 0. Then counting 13 is actuated, and the recording process is continued. The reason for this is that when the vehicle is stopped after an accident occurs, but then the vehicle is collided by another car, which induces another accident. Thereby, by the recording data of the present invention, the responsibility can be identified and the recording process can be continued after the accident. The recording process is stopped until the counting 13 is larger than the counter 12 in timer B. The process is repeated and continued. Thereby, once the data is recorded, it can be stored for a long time.

Figure 8:
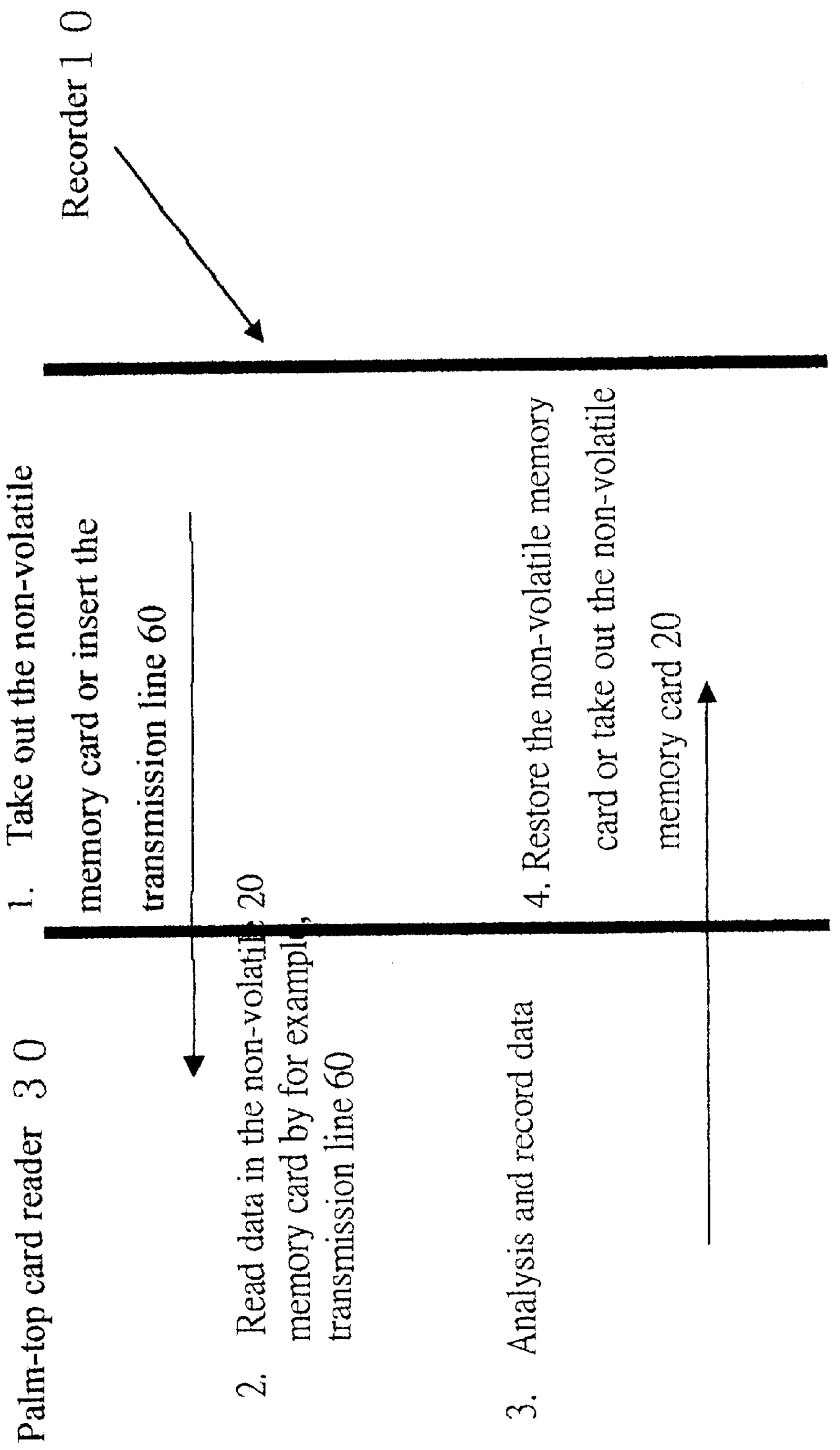
FIG. 8 is an operation flow of the palm-top card reader of the present invention.

Referring to FIG. 8, in the present invention, the recorder 10 is matched to a palm-top card reader 50. For example, when a traffic accident occurs, the traffic police arrives at the accident site, and insert the transmission line 60 into the recorder 10 of the vehicle. The other end of the transmission line 60 is inserted into the palm-top card reader 50. Thereby, the data in the non-volatile memory card 20 can be read and displayed through the palm-top card reader 50. The data include the front images, sounds in the car, speed, braking time and force, throttle opening, power, etc. Therefore, the police can understand the immediate data and the responsibility can be identified. If the power of the vehicle is exhausted, the non-volatile memory card is taken down and then is inserted into a desk-top card reader for constructing the conditions before and after the accident so as to determine the status.

Figure 9:
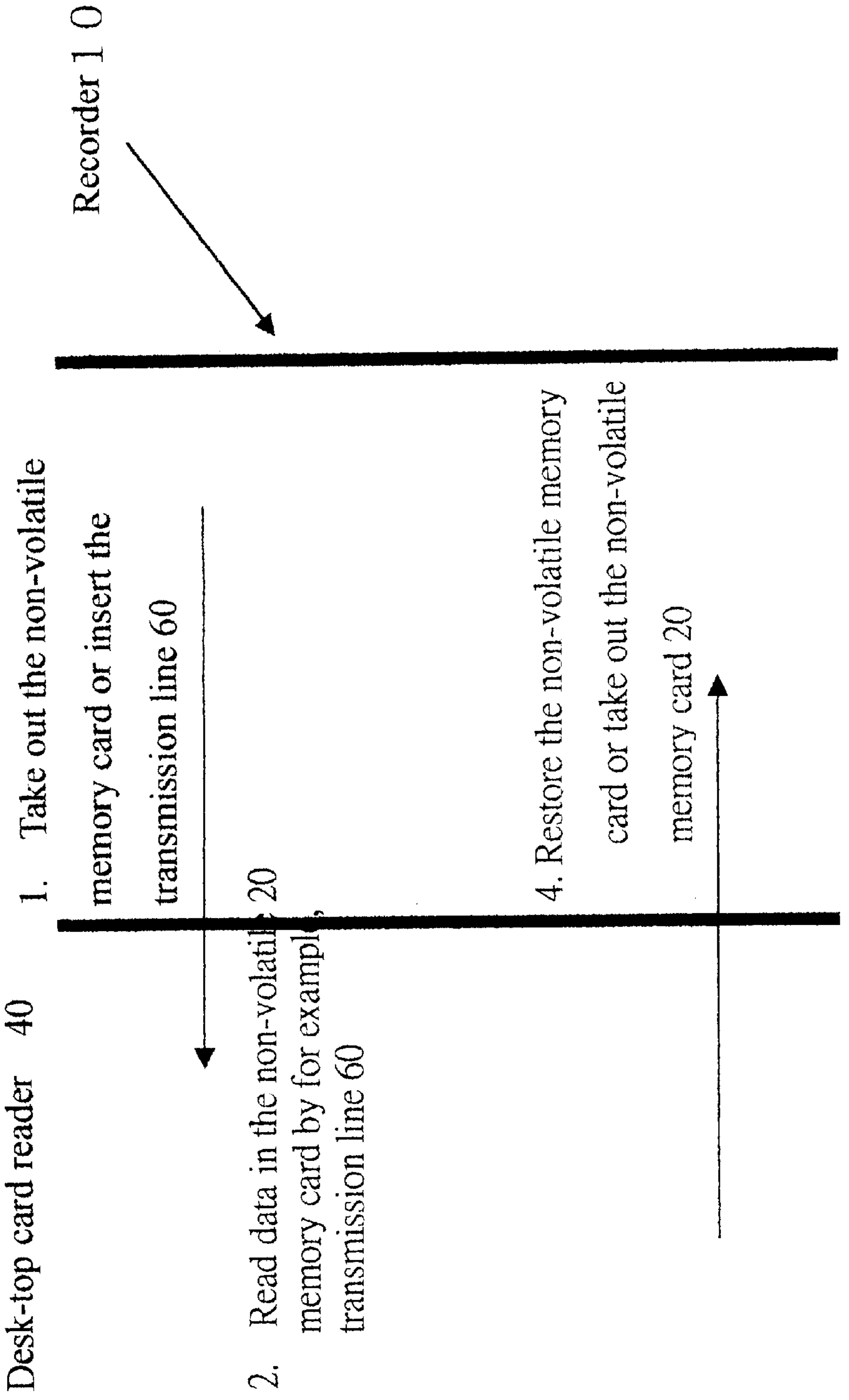
FIG. 9 shows one operation flow of the desk-top card reader of the present invention.

Referring to FIG. 9, it is illustrated that the recorder 10 of the present invention is used with a desk-top card reader 30. This is suitable for the repairing and maintenance of a vehicle. The process is identical to the above mentioned process. The operator inserts the transmission line 60 into the recorder 10 and the other end of the transmission line 60 is inserted to a desk-top card reader 30 (or a palm-top card reader 50) so as to read all data therein. Therefore, the operator can know the conditions of the vehicle, and then takes correct repairing or maintenance operations.

Therefore, in the present invention, the non-volatile memory card 20 is used as a primary recorder and a microcomputer is used as a control center. The infrared lenses is used in real-time image capturing with a Doppler detector, and A/V compressor. Not only the operation of the vehicle can be recorded completely, but the environment condition can be recorded, and thereby, the faults due to manual determination can be avoided. The accident event is reconstructed easily and clearly.

The present invention is thus described. It will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A vehicle recorder system comprising:

a system control unit as a control center of the system so that the system is capable of recording successfully;

a non-volatile memory card communicated to the system control unit for reading-only and writing repeatedly; if the capacity of the non-volatile memory card is saturated, the non-volatile memory card is capable of being used repeatedly;

a control keyboard unit connected to the system control and having functions of inputting, and selections;

a power supply for supplying power to the system control unit;

a sensing detecting unit connected to the system control unit for capturing data about a moving vehicle and then transferring the captured data to the system control unit; and an A/V compressing unit connected to the system control unit and non-volatile memory card for compressing image and voice data and transferring the compressed data to the non-volatile memory card so as to reduce the data required to be stored in the non-volatile memory card.

2. The vehicle recorder system as claimed in claim 1, wherein the system control unit is a microcomputer.

3. The vehicle recorder system as claimed in claim 1, wherein the non-volatile memory card is a plug-in non-volatile memory card.

4. The vehicle recorder system as claimed in claim 1, wherein the data captured by the sensing detecting unit includes speeds of a vehicle, braking conditions of the vehicle, throttle opening, and distances to the front vehicle.

5. The vehicle recorder system as claimed in claim 1, wherein the non-volatile memory card is used with a desk-top card reader.

6. The vehicle recorder system as claimed in claim 4, wherein the non-volatile memory card is used with a desk-top card reader.

7. The vehicle recorder system as claimed in claim 1, wherein the non-volatile memory card is used with a palm-top card reader.

8. The vehicle recorder system as claimed in claim 4, wherein the non-volatile memory card is used with a palm-top card reader.

9. The vehicle recorder system as claimed in claim 1, wherein the recorder is connected to a communication device or transferring the data in the recorder.

10. The vehicle recorder system as claimed in claim 1, wherein the recorder is connected to a communication device for transferring the data in the recorder as short messages.

* * * * *